United States Patent
Eismark et al.

(10) Patent No.: US 9,027,529 B2
(45) Date of Patent: May 12, 2015

(54) PISTON POSITIONED FOR RECIPROCAL MOVEMENT IN A COMBUSTION ENGINE CYLINDER

(75) Inventors: Jan Eismark, Göteborg (SE); Michaell Balthasar, Göteborg (SE)

(73) Assignee: Volvo Technology Corporation, Göteborg (SE)

( * ) Notice: Subject to any disclaimer, the term of this patent is extended or adjusted under 35 U.S.C. 154(b) by 310 days.

(21) Appl. No.: 13/579,610

(22) PCT Filed: Feb. 18, 2011

(86) PCT No.: PCT/EP2011/000779
§ 371 (c)(1),
(2), (4) Date: Oct. 8, 2012

(87) PCT Pub. No.: WO2011/101154
PCT Pub. Date: Aug. 25, 2011

(65) Prior Publication Data
US 2013/0199493 A1    Aug. 8, 2013

(30) Foreign Application Priority Data
Feb. 18, 2010 (SE) ....................... 1000163

(51) Int. Cl.
*F02F 3/26*     (2006.01)
*F02B 23/06*    (2006.01)
*F02F 3/00*     (2006.01)

(52) U.S. Cl.
CPC .............. *F02F 3/26* (2013.01); *F02B 23/0627* (2013.01); *F02B 23/0651* (2013.01); *F02B 23/0693* (2013.01); *F02B 23/0696* (2013.01); *Y02T 10/125* (2013.01); *F02F 3/00* (2013.01)

(58) Field of Classification Search
CPC ............................... F02F 3/26; F02B 23/0696
USPC ......... 123/279, 280, 281, 282, 283, 284, 294, 123/193.4, 276
See application file for complete search history.

(56) References Cited

U.S. PATENT DOCUMENTS 5,215,052 A * 6/1993 Augustin ...................... 123/276
5,660,156 A * 8/1997 Whitacre et al. ............... 123/279
(Continued)

FOREIGN PATENT DOCUMENTS

EP      0271478 A2    6/1988
EP      0945602 A2    9/1999
(Continued)

OTHER PUBLICATIONS

International Search Report (Apr. 11, 2011) for responding International application No. PCT/EP2011/000779.
(Continued)

*Primary Examiner* — Mahmoud Gimie
(74) *Attorney, Agent, or Firm* — WRB-IP LLP

(57) ABSTRACT

A piston is arranged for reciprocal movement in a combustion engine cylinder. Protrusions are or a ridge is arranged half way between flame plume impingement areas in a plane perpendicular to the reciprocal movement and protrude to the combustion chamber having a smooth form adapted for preserving kinetic energy in a flame plume. The protrusion or ridge includes a left side flank, a top section and a right side flank, and a transition section between each of the side flanks and the top section, the transition section including a deflection edge in order to minimize flow losses.

8 Claims, 4 Drawing Sheets

(56) References Cited

U.S. PATENT DOCUMENTS

| | | | |
|---|---|---|---|
| 6,705,273 B1 * | 3/2004 | Liu et al. | 123/263 |
| 6,732,702 B2 * | 5/2004 | Liu et al. | 123/279 |
| 6,935,301 B2 * | 8/2005 | Liu | 123/294 |
| 7,389,764 B1 * | 6/2008 | Wickman et al. | 123/279 |
| 8,464,686 B2 * | 6/2013 | Kim et al. | 123/279 |
| 2003/0136372 A1 * | 7/2003 | Liu et al. | 123/279 |
| 2003/0140890 A1 * | 7/2003 | Liu et al. | 123/279 |
| 2004/0060537 A1 * | 4/2004 | Liu et al. | 123/263 |
| 2004/0123832 A1 * | 7/2004 | Quigley et al. | 123/276 |
| 2004/0177828 A1 * | 9/2004 | Liu | 123/279 |
| 2010/0258076 A1 * | 10/2010 | Eismark et al. | 123/279 |

FOREIGN PATENT DOCUMENTS

| | | |
|---|---|---|
| FR | 2880915 A1 | 7/2006 |
| FR | 2885650 A1 | 11/2006 |
| JP | S57139631 U | 9/1982 |
| JP | S6197532 U | 6/1986 |
| JP | S63170521 | 7/1986 |
| JP | 62122129 | 8/1987 |
| JP | 04228821 | 8/1992 |
| JP | 7208172 A | 8/1995 |
| JP | 2002276375 A | 9/2002 |
| WO | 2009058055 A1 | 5/2009 |

OTHER PUBLICATIONS

Japanese Official Action (translation) (Sep. 3, 2014) for corresponding Japanese Application 2012-553226.
JP04-228821 (Aug. 18, 1992) Abstracts of Japan.
Japanese Official Action (Sep. 17, 2014) for corresponding Japanese Application 2012-553227.
Patent Abstracts of Japan 63 170521 (Jul. 14, 1988) (abstract) Mitsubishi Motors Corp.

* cited by examiner

PISTON POSITIONED FOR RECIPROCAL MOVEMENT IN A COMBUSTION ENGINE CYLINDER

BACKGROUND AND SUMMARY

The present invention relates to a device for controlling the combustion process in a combustion engine. The invention relates to such a device for reducing especially soot emissions but also carbon monoxide and hydrocarbon in combustion engines in which the fuel/cylinder gas mixture is ignited by compression heat generated in the cylinder.

Soot particles (or particulates) are a product which, during combustion, can both be formed and subsequently oxidized into carbon dioxide ($CO_2$). The quantity of soot particles measured in the exhaust gases is the net difference between formed soot and oxidized soot. The process is very complicated. Combustion with fuel-rich, fuel/air mixture with poor mixing at high temperature produces high soot formation. If the formed soot particles can be brought together with oxidizing substances such as oxygen atoms (O), oxygen molecules ($O_2$), hydroxide (OH) at sufficiently high temperature for a good oxidation rate, then a greater part of the soot particles can be oxidized. In a diesel engine, the oxidation process is considered to be in the same order of magnitude as the formation, which means that net soot production is the difference between formed quantity of soot and oxidized quantity of soot. The net emission of soot can therefore be influenced firstly by reducing the formation of soot and secondly by increasing the oxidation of soot. Carbon monoxide emissions (CO) and hydrocarbon emissions (HC) are normally very low from a diesel engine. Yet the percentages can rise if unburnt fuel ends up in relatively cool regions or stagnation regions. Regions with intense cooling can be located close to the cylinder wall. An example of where a stagnation zone can arise is where two progressing flame plumes collide or where one progressing flame plume collides with a piston wall.

Nitrogen oxides (NOx) are formed from the nitrogen content in the air in a thermal process which has a strong temperature dependency and depends on the size of the heated-up volume and the duration of the process.

A combustion process in which the fuel is injected directly into the cylinder and is ignited by increased temperature and pressure in the cylinder is generally referred to as the diesel process. When the fuel is ignited in the cylinder, combustion gases present in the cylinder undergo turbulent mixing with the burning fuel, so that a mixture-controlled diffusion flame is formed. The combustion of the fuel/gas mixture in the cylinder gives rise to heat generation, which causes the gas in the cylinder to expand and which hence causes the piston to move in the cylinder. Depending on a number of parameters, such as the injection pressure of the fuel, the quantity of exhaust gases recirculated to the cylinder, the time of injection of the fuel and the turbulence prevailing in the cylinder, different efficiency and engine emission values are obtained.

Below follows an example of state of the art arrangement attempting to lower both soot and NOx-emissions by controlling the flame, and trying to brake the well known "trade off" between soot emissions and nitrogen oxide emissions, which is typical of the diesel engine, and which "trade-off" is difficult to influence. The majority of measures which reduce soot emissions increase the nitrogen oxide emissions.

WO2009/058055 discloses as combustion engine with a combustion chamber comprising a piston, an injector with plurality of orifices arranged to inject spray/flame plumes, which impinge on a piston outer bowl section during, most of the injection. Between spray/flame plume impingement areas and in a plane substantially perpendicular to reciprocal piston movement are arranged a first type of protrusions protruding into the combustion chamber, having a smooth form for preserving kinetic energy in the flame and for redirecting circumferential flame progress mainly towards a center axis of the piston with minimal flame-to-flame interaction. A second type of protrusions are arranged in the impingement areas, being adapted for redirecting flame progress into a circumferential flame progress direction in a plane substantially perpendicular to said reciprocal piston movement and with minimal flame-to-piston wall interaction and minimal kinetic energy loss.

Said first type of protrusions work well regarding minimizing kinetic energy loss in the flame plume, but the form of the first type of protrusions according to prior art is not optimal when it comes to controlling the progress of the flame plume.

Thus, there is a need to achieve a more optimal form of said first type of protrusions (below called only "protrusion").

It is, therefore, desirable to overcome the deficiencies of the prior art and to provide an internal combustion engine containing a combustion chamber arrangement designed to further optimize the progress of the flame plume. This is done by identifying a stagnation zone where flow losses occur at the top of a protrusion and by giving the protrusion a shape that minimizes said stagnation zone.

It is also desirable to increase the robustness in the control of the flame plume main flow. The increased robustness is due to decreased sensitivity of the position where the main flow of the flame plume separates from the protrusion when said flame plume continues its progress towards the center of the combustion chamber.

It is also desirable to pr mote further after oxidation of remaining soot. The soot reduction is especially important for fuels such as for example diesel. The invention further contributes, according to an aspect thereof, to the reduction of carbon monoxide (CO) emissions and hydrocarbon (HC) emissions. The reduction of CO and HC becomes especially important for fuels such as for example DME (dimethyl ether). A bigger amount of the available kinetic energy in the flame plume can be used in a useful way for increased oxidation of remaining fuel. In this way the duration of the combustion process will be shorter, which results in a decreased fuel consumption.

It is also desirable to increase efficiency. The design of the protrusion in the combustion chamber according to an aspect of the present invention contributes to a faster combustion process and thereby resulting in increased efficiency.

Known effects when using, for example, an increased amount of Exhaust Gas Recirculation can at least partly be compensated for by aspects of the present invention.

According to an aspect of the invention, a piston is arranged for reciprocal movement in a combustion engine cylinder between a bottom dead center position and a top dead center position. Said piston including a piston crown comprising an upper surface facing a combustion chamber. Said piston crown containing a piston bowl formed by an outwardly opening cavity, and where said piston bowl comprising an outwardly flared outer bowl section having a concave curvilinear shape in cross section, at least one intake port arranged to provide the combustion chamber with intake air, an injector arranged to inject fuel into the combustion chamber from a position adjacent a geometrical centre of said combustion chamber and having an impingement area of a progressing flame plume in said outer bowl section, and where substantially half way between said impingement areas and in a plane substantially perpendicular to said reciprocal movement are arranged protrusions protruding into the combustion chamber and having a smooth form adapted for preserving kinetic energy in a flame plume and where each of said protrusions has a shape of a longitudinal ridge that extends only in the outer bowl area in a plane substantially parallel to or dose to being parallel to said reciprocal movement, and where said ridge comprising a left side flank, a top section and a right side flank when seen in a plane perpendicular to said reciprocal movement, and where a transition section is arranged between each of said side flanks and the top section. Said piston is characterized in that said transition section comprising a deflection edge in order to minimize flow losses.

According to one embodiment of the invention each of said side flanks having a side surface and said top section having a top surface, and where an separation angle between a side surface tangent and a top surface tangent in said transition section, where each of said side surfaces meet said top surface and forming said deflection edge, is between 90 and 160 degrees. In a further embodiment said separation angle is between 120 and 150 degrees.

According to a further embodiment of the invention a deflection angle is defined as the angle between a line parallel to a centerline of the protrusion and said side surface tangent. In a further embodiment said deflection angle (88) is between −30 and +30 degrees. Different values of the deflection angle can be combined with different values of the separation angle.

In another embodiment of the invention each of said side flanks having a concave curvilinear shape with a first radius and said top section having a convex curvilinear shape with a second radius when seen in a plane perpendicular to said reciprocal movement.

In a further embodiment of the invention said deflection edge is arranged along the whole extension of the ridge.

In another embodiment of the invention said protrusion are arranged for redirecting circumferential flame progress mainly towards a center axis of the piston with minimal flame-to-flame interaction.

BRIEF DESCRIPTION OF THE DRAWINGS

The present invention will be described in greater detail below with reference to the accompanying drawings which, for the purpose of exemplification, shows further preferred embodiments of the invention and also the technical background, and in which:

FIG. 2b diagrammatically shows an alternative embodiment according to prior art of the embodiment in FIG. 2a.

DETAILED DESCRIPTION

Figure 1:
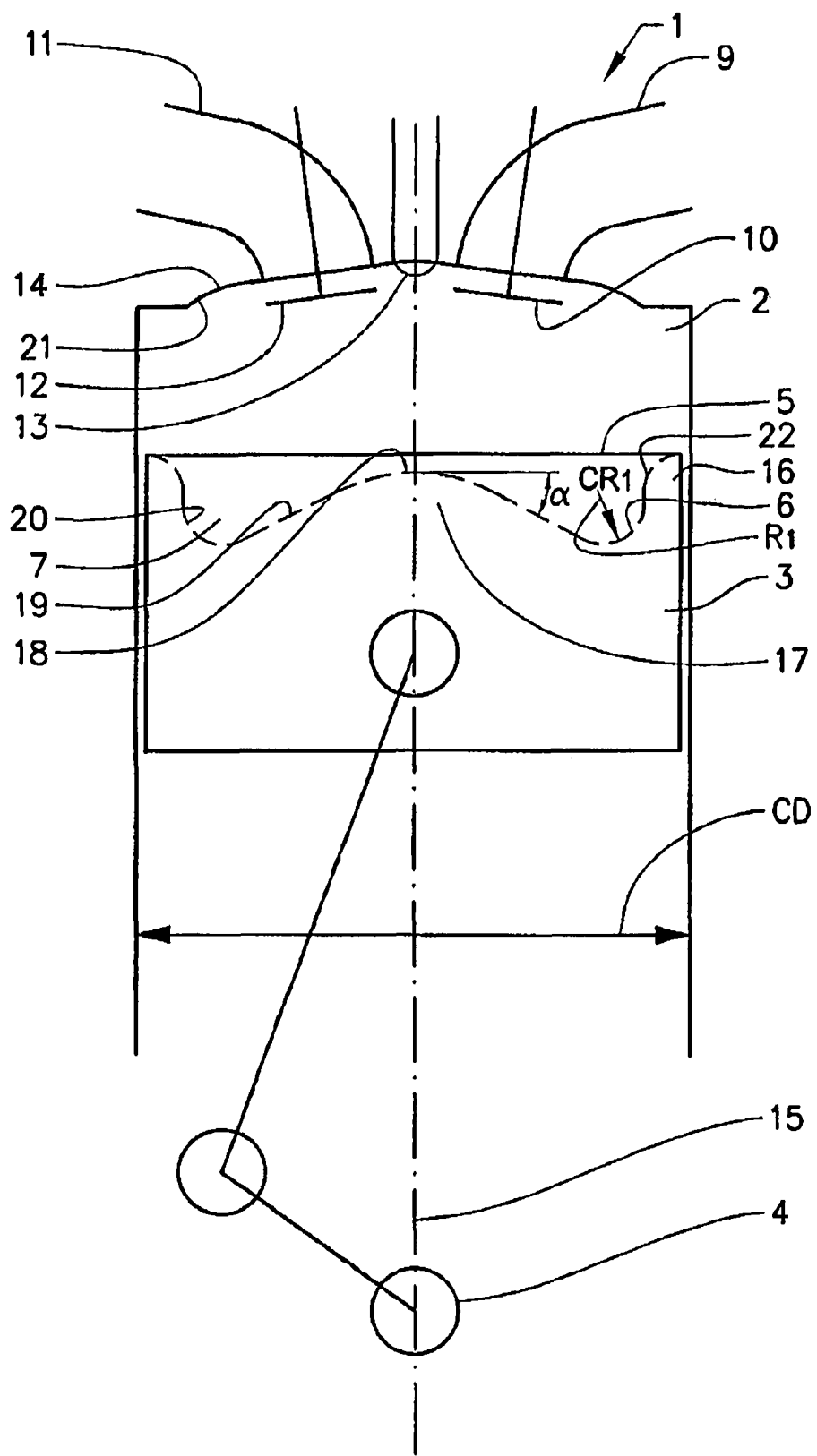
FIG. 1 diagrammatically shows a cut view of a prior art piston and cylinder in a combustion engine, where the invention can be implemented.

In FIG. 1, a diagrammatic view is shown of a combustion engine 1 which is designed to work according to the diesel process. The engine 1 comprises a cylinder 2 and a piston 3, which reciprocates in the cylinder 2 and is connected to a crankshaft 4 so that the piston 3 is set to reverse in the cylinder 2 at an upper and lower dead centre position. As is also common, one end of the cylinder cavity is closed by a engine cylinder head 14. The piston 3 is provided in its upper surface 5 with a piston bowl 6, which forms a combustion chamber 7, together with inner surface 21 of a cylinder head 14 and walls of the cylinder 2. In the cylinder head 14 one or more induction ports 9 are arranged. The connection between a respective induction port 9 and the cylinder 2 can be opened and closed with an induction valve 10 disposed in each induction port 9. Arranged in the cylinder head are also one or more exhaust ports 11. The connection between a respective exhaust port 11 and the cylinder 2 can be opened and closed with an exhaust valve 12 disposed in each exhaust port 11. The opening and closing of valves 10 and 11 may be achieved by a mechanical cam or hydraulic actuation system or other motive system in carefully controlled time sequence with the reciprocal movement of piston 3.

In the cylinder head 14 there is disposed at least one fuel injector 13, through which fuel is injected into the cylinder 2 as a fuel spray so that the fuel is mixed with gas compressed in the cylinder 2 to form a fuel/gas mixture, which is ignited by compression heat generated in the cylinder 2. The ignited part of the spray forms a flame plume. During injection a part of the spray closest to the injector with newly injected fuel has not yet started to burn. The fuel is preferably injected with a very high pressure. Injector 13 includes a plurality of small injection orifices (not shown), formed in the lower end of a nozzle assembly of the injector 13 for permitting the high pressure fuel to flow from a nozzle cavity of the injector 13 into the combustion chamber 7 with a very high pressure to induce thorough mixing of the fuel with the high temperature, compressed charge air within combustion chamber 7. It should be understood that injector 13 may be any type of injector capable of injecting high pressure fuel through a plurality of injector orifices into the combustion chamber 7 in the manner described, hereinbelow. Moreover, injector 13 may include a mechanically actuated plunger housed within the injector body for creating the high pressure during an advancement stroke of the plunger assembly.

Alternatively, the injector 13 may receive high pressure fuel from an upstream high pressure source such as in a pump-line-nozzle system including one or more high pressure pumps and/or a high pressure accumulator and/or a fuel distributor. The injector 13 may include an electronically actuated injection control valve which supplies high pressure fuel to the nozzle valve assembly to open a nozzle valve element, or controls the draining of high pressure fuel from the nozzle valve cavity to create a pressure imbalance on the nozzle valve element thereby causing the nozzle valve element, to open and close to form an injection event. For example, the nozzle valve element may be a conventional spring-biased closed nozzle valve element actuated by fuel pressure. The fuel injector 13 is preferably centrally disposed in the cylinder head so a geometrical central axis of the fuel injector coincide with a geometrical central axis 15 of the cylinder, which geometrical central axis also is an axis of reciprocation of the piston 3, as shown in FIG. 1.

The combustion engine 1 shown in FIG. 1 can work according to the four-stroke and/or two-stroke principle. The engine 1 preferably comprises a plurality of cylinders 2, each provided with a piston 3, where each piston 3 is connected to a common crankshaft 4 through a connecting rod and thus causing the piston to reciprocate along a rectilinear path within the cylinder 2 as the engine crankshaft 4 rotates.

FIG. 1 illustrates the position of the piston 3 circa 45 degrees before a top dead center (TDC) position. A TDC position is achieved when the crankshaft is positioned to move the piston to the furthest most position away from the rotational axis of the crankshaft. In the conventional manner, the piston moves from the top dead center position to a bottom dead center (BDC) position when advancing through intake and power strokes. For purposes of this disclosure, the words "upward" and "upwardly" correspond to the direction away from the engine crankshaft and the words "down" and "downwardly" correspond to the direction toward the crankshaft of the engine or bottom dead center position of the piston.

At an uppermost, TDC position, piston 3 has just completed its upward compression stroke during which the charge air allowed to enter the combustion chamber 7 from induction port 9 is compressed thereby raising its temperature above the ignition temperature of the engine's fuel. This position is here considered as the 360 degrees position commencing the expansion/combustion stroke of the complete 720 degrees four stroke cycle of piston 3. The amount of charge air that is caused to enter the combustion chambers may be increased by providing a pressure boost in the engine's intake manifold. This pressure boost may be provided, for example, by a turbocharger (not shown driven by a turbine powered by the engine's exhaust, or maybe driven by the engine's crankshaft. The pressure boost may also be provided by a two-stage turbocharger, a turbo-compound arrangement etc.

The upper portion of piston 3 may be referred to as the piston crown 16. Piston crown 16 includes the upper surface 5 partially forming combustion chamber 7 and a piston bowl 6 formed by an upwardly opening cavity. Piston bowl 6 includes a projecting portion 17 preferably positioned at or near the center of bowl 6. Projecting portion 17 includes a distal end 18 positioned, in the preferred embodiment shown in FIG. 1, at the center of piston bowl 3 and thus positioned along the axis of reciprocation 15 of piston 3.

Projecting portion 17 also includes an inner bowl floor section 19 extending from projecting portion 17 downwardly at an inner bowl floor angle a from a plane perpendicular to the axis of reciprocation of piston 3 as shown in FIG. 1. Outer bowl section 20 is designed with a particular radius Ri and a particular location for a center of radius CRi.

Figure 2A:
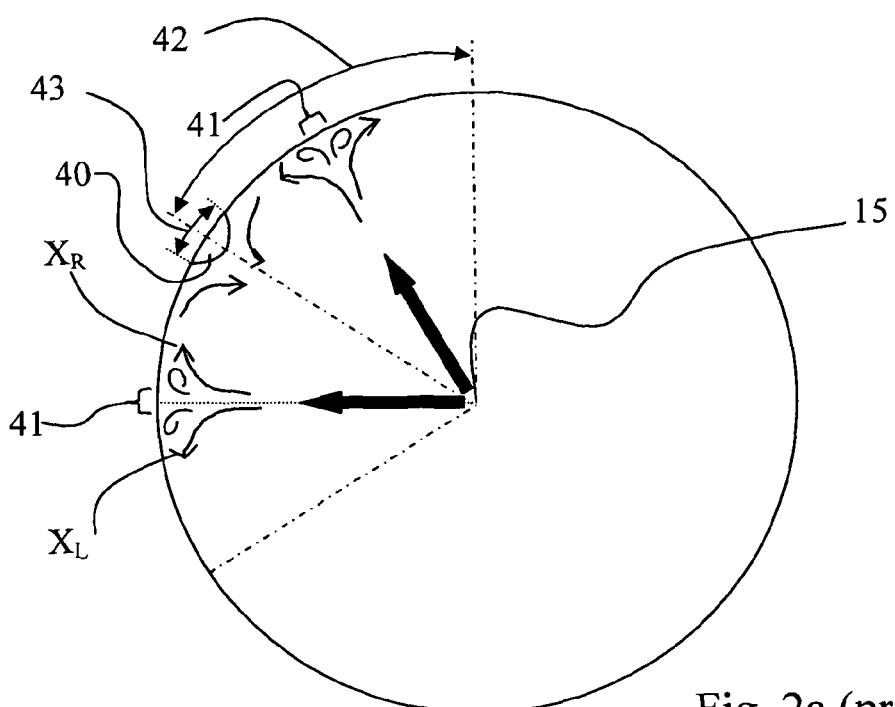
FIG. 2a diagrammatically shows a top view of the piston in FIG. 1 with spray/flame flows according to prior art.

FIG. 2a shows a prior art embodiment with only a first type of protrusion 40 evenly distributed around the circumference of the outer bowl 6. Said first type of protrusions are arranged approximately halfway between the impingement areas 41 of two adjacent flame plumes (in FIGS. 2a and 2b indicated by the two biggest arrows).

Figure 2B:
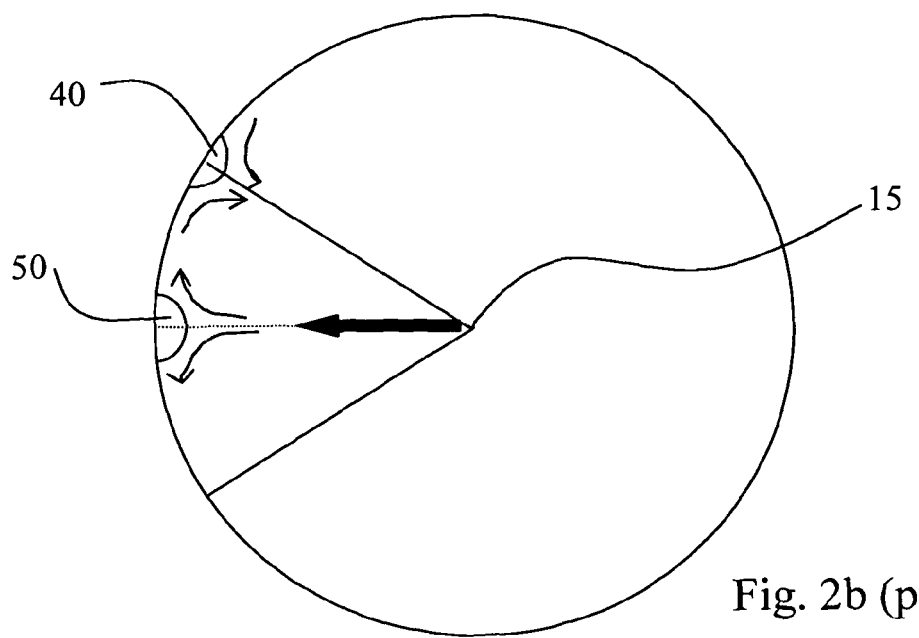

According to prior art said first type of protrusions has a form of a ridge that extends in the vertical direction, thus in FIGS. 2a and 2b the protrusions 40 are seen in a cross-section from above.

Preferably a ridge of the first type of protrusion 40 extends in length corresponding to the length of an impingement area. Thus, said ridge of said first type of protrusion extends at least from a first position arranged in a first horizontal plane that is common for said first impingement point and up to a second position arranged in a second horizontal plane that is common for said second impingement point. The mentioned planes are perpendicular to the reciprocal movement of said piston 3 or geometrical central axis 15 of the cylinder.

Each half of a width 43 of the base of a ridge can be extended up to for example, approximately ⅓ of a total spray sector distance 42 along the circular shape of an outer bowl section.

FIG. 2b shows an embodiment with said first type of protrusion and as second type of protrusion 50. Said second type of protrusion redirects the horizontal or substantially horizontal (dependent of how angled the injected flame plume is in relation to a horizontal plate) movement of the flame from a direction towards the outer bowl area (impingement area) to tangential directions.

According to prior art the overall dimensions, shape and/or relative positioning of the combustion chamber components and features (including said protrusions) can be shaped such that the momentum of the fuel spray/burning cylinder gas flame is preserved as long as possible on its way from the injector.

Further, the dimensions, shape and/or relative positioning of the combustion chamber components and features can be shaped such that a predetermined level of balance between vertical (mainly upward) and tangential momentum (directed in a plane perpendicular to the axis 15) of the fuel spray/flame plume is achieved.

This present invention is particularly directed towards the enhancement of the redirection of the horizontal movements of the flame plume toward the axis 15, i. e. when the flame changes direction from being directed towards the outer bowl to being directed in said tangential direction, and further the redirection of the tangential movement to a movement directed toward said axis 15, which is seen from above in FIGS. 2a and 2b.

The engine of the present invention includes protrusions shaped, as described hereinbelow, to advantageously further reduce particulate matter (P) with maintained fuel economy. The invention is especially directed to reduce soot emissions. Soot is one fraction of PM. The inventive protrusion increases the robustness of flame plume flow control. Unwanted mixing of rich combustion zones above the top of a protrusion can be decreased.

Figure 3:
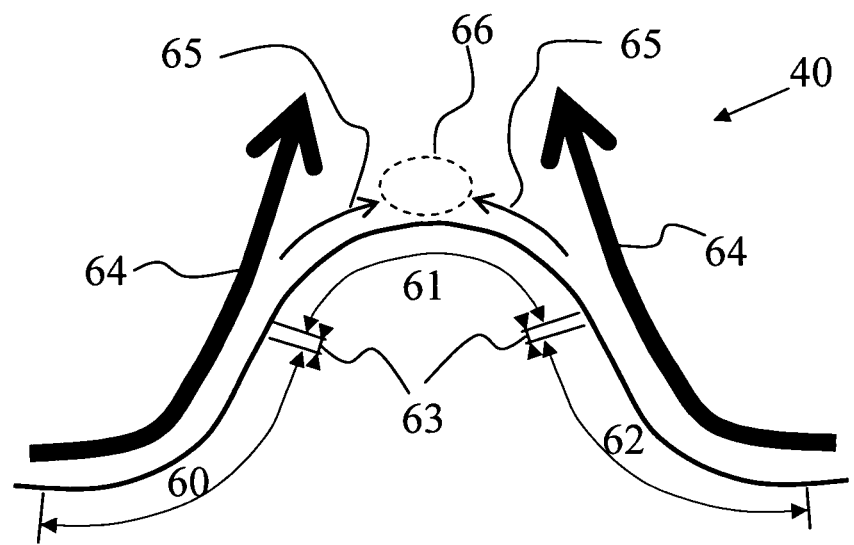
FIG. 3 diagrammatically shows a cross section of an enlarged protrusion 40 according to prior art.

FIG. 3 discloses one of said protrusions 40 according to prior art. As mentioned said protrusion 40 has a shape of a longitudinal ridge that extends only in the outer bowl area in a plane substantially parallel or close to being parallel (for example it can have between 1-30 degrees deviation from said reciprocal movement or said geometrical central axis 15 of the cylinder) to said reciprocal movement. Said ridge comprising a left side flank 60, a top section 61 and a right side flank 62, when seen in a plane parallel to said reciprocal movement. A transition section 63 can be defined, as being a section between each of said side flanks and the top section. Arrows 64 disclose the main-flow of the redirected flame plume propagating from each side of said protrusion, in a plane perpendicular to said geometrical central axis 15 of the cylinder, and continuing in a direction mainly towards the geometrical central axis 15 of the cylinder (not disclosed in FIGS. 3, 4 and 5). According to poor art the smooth redirection of the main flow 64 is achieved by shaping said side flanks and top section with a curvilinear shape having radius well adapted for causing minimal flow losses.

As can be seen in FIG. 3 some small parts of the main flow 64 will follow the curvilinear shape of said top section 61. Thus, it could be said that there is an undefined main flow separation point, that is, when it comes to position, direction and size of the main flow regarding how and when it separates from the side flank and/or top section. Further, these small parts can be defined as loss flows 65 since they cause a stagnation of the flow in a volume 66, that extends along said ridge just above the top section 61 of the ridge.

Figure 4:
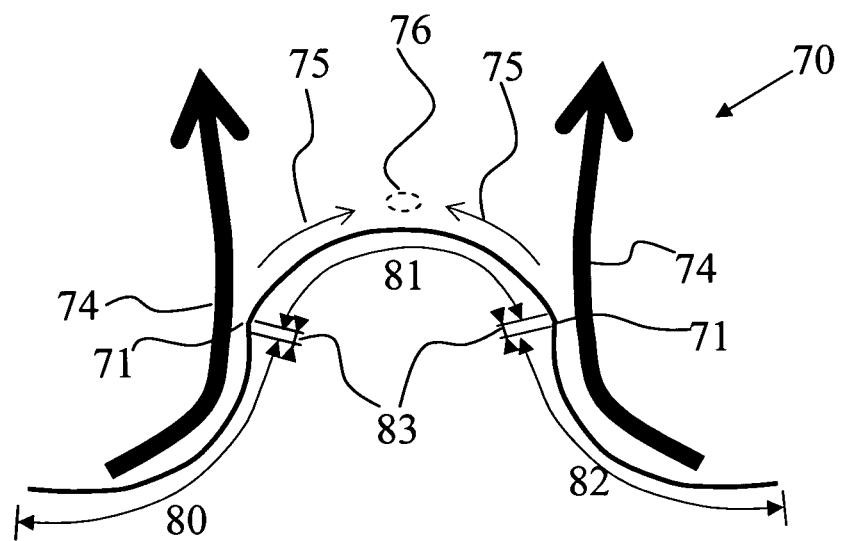
FIG. 4 diagrammatically shows a cross section of an enlarged protrusion according to the invention.

FIG. 4 discloses a protrusion 70 according to an embodiment of the invention. Said protrusion 70 has corresponding left side flank 80, right side flank 82, top section 81 and transition sections 83. According to the invention said transition section comprises a deflection edge 71 on each side. (The effect of the deflection edge is that there will be a fixation of the main flow separation from said protrusion at the deflection edge. Thus, the control of the flame plume main flow progress will increase. The position of where the main flow separates from the protrusion can be much more fixed. Thus, a fixation position for the separation of the main flow from the protrusion has been defined.

Further, side flanks of two adjacent protrusions can in one embodiment of the invention reach approximately ⅓ of a sector (corresponding to 42 in FIG. 2a), that is, ⅓ of said sector between the protrusions does not comprise side flanks. In a further embodiment said side flanks can barely reach each other at ½ of a sector, that is, right between two adjacent protrusions.

Figure 5:
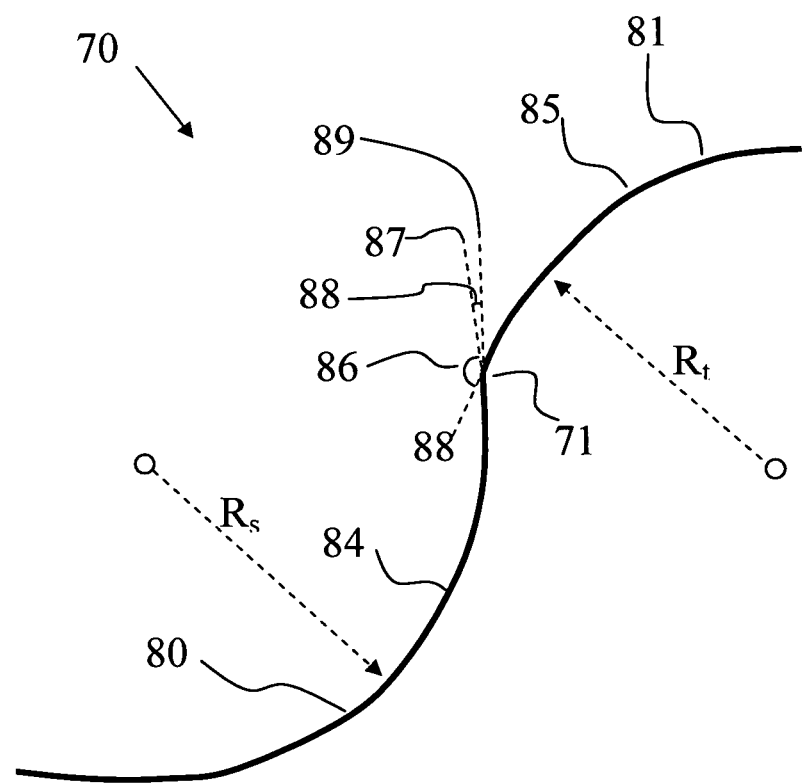
FIG. 5 diagrammatically shows a cross section of one half of a further enlarged protrusion according to the protrusion disclosed in FIG. 4.

In FIG. 5 half of the protrusion 70 in FIG. 4 is disclosed and where said side flank 80 is shaped according to a concave curvilinear shape with a first radius Rs and said top section 81 is shaped according to a convex curvilinear shape with a second radius Rt in a plane perpendicular to said reciprocal movement. Said radius Rs and Rt are selected to shape a surface of said protrusion 70 that is smooth and that causes minimal flow losses to the main flows 74 of the flame plume.

Each of said side flanks 80, 82 has a side surface 84 and said top section 81 has a top surface 85, where said side surfaces and said top surface together form a surface of said protrusion 70 facing the combustion chamber.

Said radius Rs and Rt do not need to be constant along the extension of said surfaces 84 and/or 85. Both said radius can be varied along said surfaces or can be partly varied and partly constant.

In a further embodiment the radius Rt can be increased such that a distance between said surfaces 84 and 85 increases. This can be used for scaling, adapting protrusions in one size of piston to different numbers of nozzle holes in the injector.

A separation angle 86 between a side surface tangent 87 and a top surface tangent 88 in said transition section 83, where each of said side surfaces meet said top surface and forms said deflection edge 71, can be in an interval between 90 and 160 degrees. In a further embodiment of the invention said separation angle can also be between 120 and 150 degrees. Said inventive deflection edge 71 can be arranged along the whole extension of the ridge or protrusion 70. The separation angle defines how sharp the deflection edge is. The sharper angle, the more pronounced separation effect on the main flow.

As can be seen in FIG. 5 a deflection angle 88 refers to the ability of the ridge to control the principal direction of the main flow while leaving the ridge at the deflection edge 71. The deflection angle 88 is defined as the angle between a line 89, parallel to a centerline of the protrusion, and the direction of the main flow governed by the shape of the side flank, that is, said side surface tangent 87. Said deflection angle can be between −30 and +30 degrees. In the example of FIG. 5 said deflection angle is approximately −10 degrees.

In further embodiments of the invention different values of the deflection angle can be combined with different values of the separation angle.

As it is illustrated in FIG. 4 the separation angle according to the invention results in a decrease of corresponding small parts 75 of the main flow 74 that will follow the curvilinear shape of said top section 81. Thus, an advantage of the invention is that a stagnation of the flow in a volume 76 above the top section 81 will be minimized. Further, the inventive protrusion 70 increases the robustness of flame plume flow control, that is, the control of the main flow 74. Unwanted turbulence and stagnation in the flow above the top of said protrusion 81 can be decreased.

Said inventive pistons can be manufactured by machining, such as a turning lathe and/or a milling cutter, and/or by forging in order to shape said protrusions.

The present invention can be used in engines driven by fuels, such as for example diesel. DME (dimethyl ether) or the like.

The invention should not be deemed to be limited to the embodiments described above, but rather a number of further variants and modifications are conceivable within the scope of the following patent claims.

The invention claimed is:

1. A piston arranged for reciprocal movement in a combustion engine cylinder between a bottom dead center position and a top dead center position,
   the piston including a piston crown comprising an upper surface facing a combustion chamber, the piston crown containing a piston bowl formed by an outwardly opening cavity, the piston bowl comprising an outwardly flared outer bowl section having a concave curvilinear shape in cross section, at least one intake port arranged to provide the combustion chamber with intake air,
   an injector arranged to inject fuel into the combustion chamber from a position adjacent a geometrical centre of the combustion chamber and having impingement areas for progressing flame plumes in the outer bowl section, and
   protrusions arranged substantially half way between the impingement areas and in plane substantially perpendicular to the reciprocal movement protruding into the combustion chamber and having a smooth form adapted for preserving kinetic energy in a flame plume, each of the protrusions having a shape of a longitudinal ridge that extends only in the outer bowl area in a plane substantially parallel to or close to being parallel to the reciprocal movement, the ridge comprising a left side flank, a top section and a right, side flank when seen in a plane perpendicular to the reciprocal movement, the protrusions being arranged for redirecting circumferential flame progress mainly towards a center axis of the piston with minimal flame-to-flame interaction, and a transition section being arranged between each of the side flanks and the top section, the transition section comprising a deflection edge in order to minimize flow losses.

2. A piston as in claim 1, where each of the side flanks has a side surface and the top section has a top surface, wherein a separation angle between a side surface tangent and a top surface tangent in the transition section, where each of the side surfaces meet the top surface and boning the deflection edge, is between 90 and 160 degrees.

3. A piston as in claim 2, wherein the separation angle is between 120 and 150 degrees.

4. A piston as in claim 2, wherein a deflection angle is defined as the angle between a line, parallel to a centerline of the protrusion, and the side surface tangent.

5. A piston as in claim 4, wherein the deflection angle is between −30 and +30 degrees.

6. A piston as in claim 4, wherein different values of the deflection angle can be combined with different values of the separation angle.

7. A piston as in claim 1, wherein each of the side flanks having a concave curvilinear shape with a first radius and the top section having a convex curvilinear shape with a second radius when seen in a plane perpendicular to the reciprocal movement.

8. A piston as in claim 1, wherein the deflection edge is arranged along the whole extension of the ridge.

* * * * *